(No Model.)
O. F. JARVIS.
COMBINED CORN, COTTON, AND SEED PLANTER.
No. 283,347. Patented Aug. 14, 1883.
2 Sheets—Sheet 1.
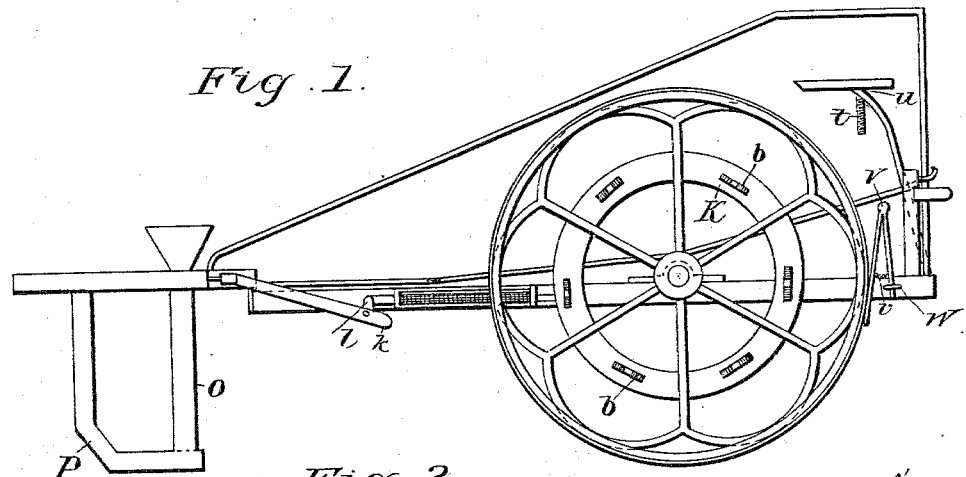
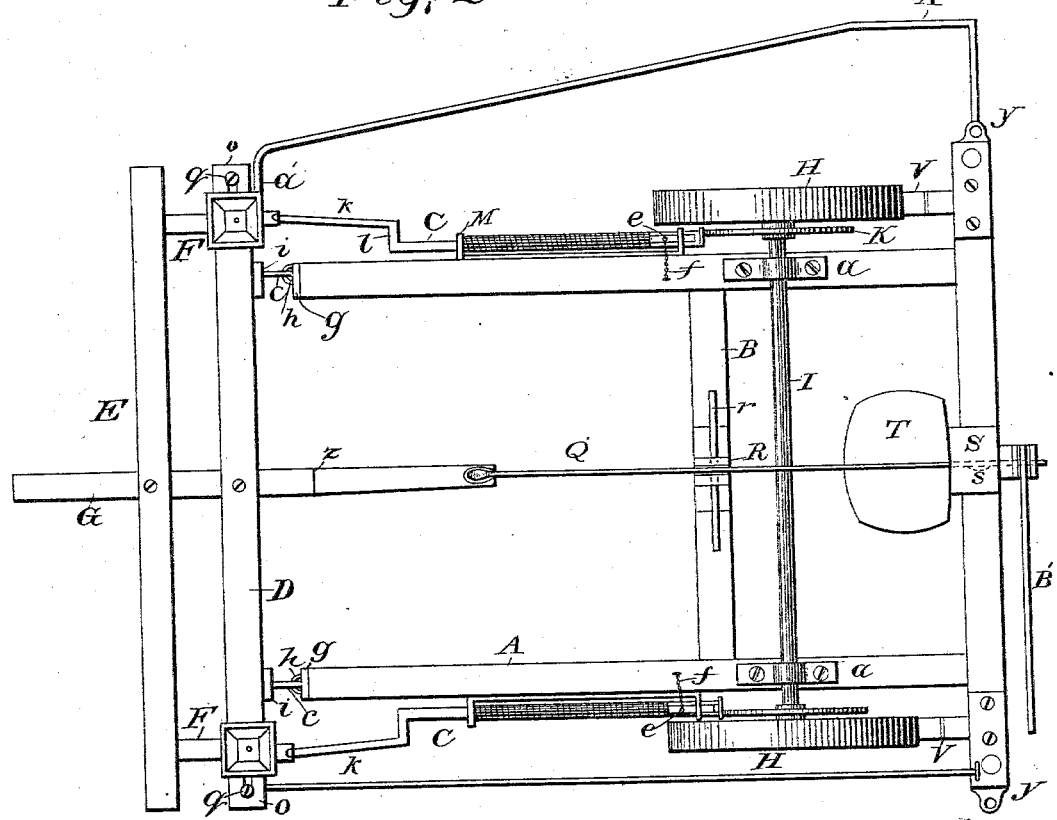
Witnesses:
Geo. R. Thompson
M. C. Hartwell
Inventor:
Oscar F. Jarvis (No Model.) 2 Sheets—Sheet 2.
O. F. JARVIS.
COMBINED CORN, COTTON, AND SEED PLANTER.
No. 283,347. Patented Aug. 14, 1883.
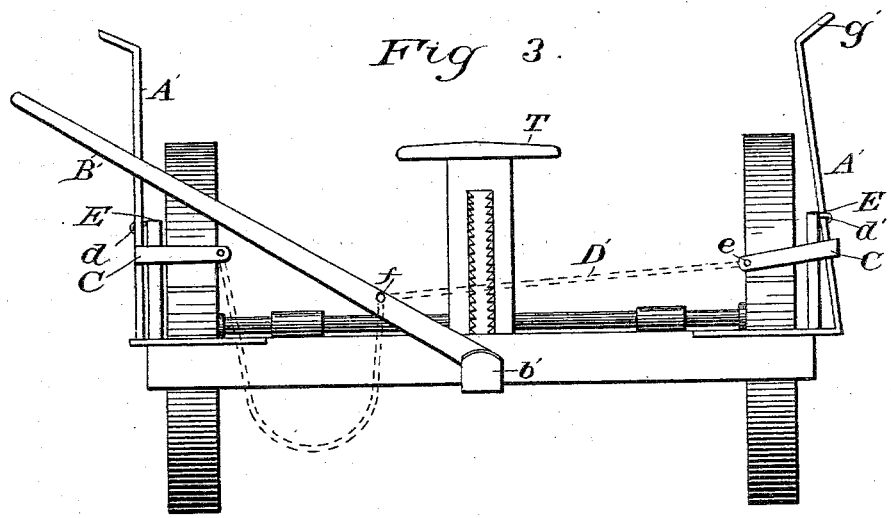
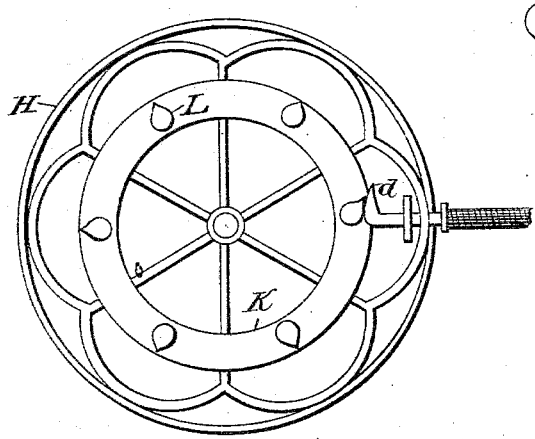
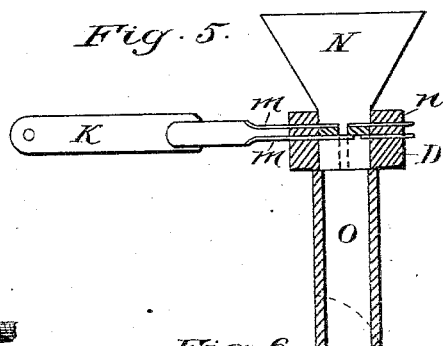
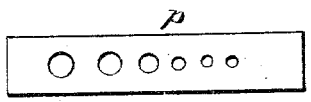
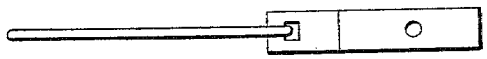
Witnesses:
Geo R Thompson
M. C. Hartwell
Inventor:
Oscar F. Jarvis

UNITED STATES PATENT OFFICE.

OSCAR F. JARVIS, OF KANSAS CITY, MISSOURI.

COMBINED CORN, COTTON, AND SEED PLANTER.

SPECIFICATION forming part of Letters Patent No. 283,347, dated August 14, 1883.

Application filed May 20, 1882. (No model.)

*To all whom it may concern:*

Be it known that I, OSCAR F. JARVIS, of Kansas City, in the county of Jackson and State of Missouri, have invented a new and useful Improvement in Combined Corn, Cotton, and Seed Planters; and I do hereby declare that the following is a full, clear, and exact description thereof, which will enable others skilled in the art to make and use the same, reference being had to the accompanying drawings, forming part of this specification.

My invention has for its object the construction of a planter which may be adapted for all varieties of seed, and so regulated that the same may be dropped automatically at any required interval, as in hills or drills, obviating the necessity of laying off the ground prior to planting, and thereby increasing the efficiency of this class of machines.

My invention consists, first, in the arrangement upon the wheels of a planter of a number of independent rotary cams for actuating at measured intervals the feeding devices for the seed; second, in the series of rotary cams upon the running wheels operating the connecting-rod, and the means for giving an alternate motion to the feed-plates in the hopper; third, in the arrangement of the feeding and dropping plates under the hopper; fourth, in the graduating-plate arranged between the feeding and dropping plates under the hopper; fifth, in the means for disconnecting the automatic connecting-rod from contact with the cams on the running wheels; sixth, in an adjustable spring-seat and the arrangement of the spring for holding the lever in place; seventh, in the devices for preventing the clogging of the wheels, and the means for securing the same from contact with the wheels, when desired; eighth, in the novel means for raising and lowering the markers on the side of the planter.

In the drawings, Figure 1 is a side elevation of the planter. Fig. 2 is a plan view of the same. Fig. 3 is an end elevation of the planter, showing the marker and the devices for raising and lowering the same. Fig. 4 is a view of the inner side of the running wheel. Fig. 5 is a sectional elevation of the seed-dropping devices. Fig. 6 is a view of the dropping-plate. Fig. 7 is a view of the feeding-plates.

Similar letters of reference indicate corresponding parts in the several figures.

A represents the frame-work of a planter, having center rails, B, and end rail, C'.

D is the main rail of the seed-frame, having forward rails, E, connected thereto by braces F F, for holding the runner in place.

G is a forked bar for receiving the pole.

H H are running wheels of the planter, rigidly attached to and revolving with the axle I.

$a\ a$ are journal-boxes on center rail, B, and supports, by means of the axle, the body of the carriage.

K is a circular plate upon the inner side of running wheel H of the planter.

L L are rotary cams, movably attached to circular plate K by thumb-screws $b\ b$.

M is a plate for receiving an automatic connecting-rod, C.

$d$ is a beveled head on connecting-rod C, for engaging with the cams L L on the running wheels.

$e$ is a check-bolt connected with the carriage-frame A by chain $f$, and enters the automatic connecting-rod C at $x$.

$g\ g$ are guard-plates on carriage-frame A, and carries eyebolt $h$.

$i\ i$ are pintle-plates, having pintles $c\ c$ for receiving eyebolt $h$ and connecting each part of the carriage.

$k\ k$ are crank-shafts, connected at $l$ by slotted pin fastening to the automatic connecting-rod C.

$m\ m$ are duplex feeding and dropping plates having two or more openings, and connected by a bolt with crank-shafts $k\ k$.

N is a seed-hopper, attached by plates $n\ n$ to the main rail of the seed-frame, and provided with slots $o$.

$p$ is a graduating-plate, provided with alternate perforations and adjustable screw $q$.

O is a triangular seed-spout secured to the under side of the seed-frame D.

P is a bevel-faced runner, connected with seed-spout O and held in place by forward rail, E, on said frame.

Q is an extended jointed lever, securely bolted to seed-frame at $z$, and fulcrumed upon the center rail of the carriage in guide-plate R by means of bolt $r$.

S is a slotted spring for holding the seat, provided with serrations or notches in said slot, for receiving and retaining at certain distances the flanged end of lever Q at *s*.

T is a rotary spring-seat, elevated or depressed at will by screw-bolt *t*, passing through neck *u* on spring S.

V is a hinged cleaner, having spring *v* and retaining-catch W.

Y Y are plates on end rails, C, for receiving the end of a marker or devices for guiding the planter.

A' is an adjustable marker, attached at *a'* to the seed-frame, and also at Y on the end rails of the planter, and has a marking-point, *g'*.

B' is a lever for raising and lowering the marker, and is connected to the end rail of the planter at *b'*.

*c'* is a bent arm on marker A'.

D' is a chain for holding the markers in position, and is attached to arm *c'* at *e'* and to lever B' at *f'*.

E' is a post on end rail, C.

*d'* is a catch on post E'.

In the construction of the planter the forward part of the same, carrying the devices for holding and dropping the seed, is removably connected by means of pintles *c c* and eyebolt *h* with the main carriage, to permit the runners to follow the inequalities of the ground.

In manufacturing the running wheels a circular plate, K, is forged or cast upon the spokes between the hub and the tire. A number of perforations are made in the plate for receiving a series of thumb-screws, *b b*, which hold in place, on the inner side of the plate, any required number of cams. These cams may be attached directly to the wheels; but I prefer the method described. In the revolution of the running wheel the cams, if thrown into position, will meet at regular intervals the face *d* of an automatic connecting-rod, C, which operates a crank-shaft, *k*, which in turn is connected with and operates automatically the duplex feeding-plate in the hopper. This duplex feeding and dropping plate *m* may be made in one piece or of various sizes, and has two or more perforations, one or more for the seed to drop through and lodge in the perforations of the graduating-plate, and others in the second plate beneath the graduating-plate to discharge alternately the seed. The perforations in the reciprocating feeding-plate are arranged to communicate with the perforations in the graduating-plate beneath, and when so situated the seed drops into the perforations in the graduating-plate, and is held there until the time for dropping, when the lower or dropping plate is thrown into communication with the graduating-plate, and the feeding-plate has closed communication above, thus insuring a certainty in the amount of seed to be dropped and preventing the passage of air-currents. In my arrangement of the graduating-plate the seed are not cut in feeding, and an important advantage is thus obtained. The graduating-plate is arranged to slide transversely between the upper and lower feeding-plates, and is provided with a number of perforations of various sizes, so that in changing the varieties of seed, as from corn to cotton, the plates may be also adjusted under the hopper to drop any corresponding amount. In dropping cotton the thickness of the plate may be three or four times that for dropping corn. A set-screw, *q*, sliding in slot *o*, holds the graduating-plate in any required position. The feeding and dropping plates may be arranged to reciprocate past the graduating-plate within a suitable guide-box; or plates *m m*, instead of forming part of the box, as shown, may be fastened directly to the rails of the seed-frame.

In my planter, runner P is constructed with a bevel-face above the line of the end of the seed-spout, thus permitting the lower point to open and deepen the soil for receiving the seed.

The extended lever Q, I have rigidly attached to the seed-frame of the planter, and connected by a short vertical lever to a second horizontal lever fulcrumed upon the center rail of the planter, and extending through a slot in the spring under the seat, so that when it is required to turn the machine the depression of the lever will raise the seed-frame out of the furrow and hold the same in a direct line with the frame-work of the planter.

In constructing the curved spring S for the seat, I either make the same in two parts or in one piece, slotted at the required length. The end of the lever is then carried through the slot, which may be notched at any interval to retain the same. The seat may be attached to the spring S in any suitable way; or when said spring is being made the seat may be constructed as part of it. I prefer, however, to use a separate seat, so as to be easily raised or lowered, as shown, to suit the convenience of the driver. The bolt *r* affords a foot-rest for the driver and supports the extended lever Q.

The cleaning devices for the wheels V, I construct in two parts, and hinge them at the upper end. One leaf is then fastened to the end rail of the planter, and the opposite leaf is held against the tire of the wheel by a spring, *v*. When it is desired to hold the cleaner out of contact with the wheel, a catch, W, on the end rail is thrown over the end of the leaf for that purpose.

A plate, Y, on the end rail of the planter is intended to receive the connecting device for the marker. When going to or returning from the field, it may be necessary to prevent the operation of the feeding devices on the planter, and to attain that result I have arranged the automatic connecting-rod to receive a check-bolt at *x*, whereby the face of the rod is held from contact with the cams on the wheels.

By rigidly connecting the axle I with the running wheels of the planter I am enabled, upon rough and hilly ground, to drop the seed simultaneously from the hoppers, the feeding and dropping devices on both sides of the planter operating as effectually with either one of the running wheels. The markers A' are arranged on both sides of the planter, and connected together transversely by chain D', or an equivalent device. This chain D' is also attached to a vertical lever located midway upon the machine. By this arrangement the markers are alternately raised on one side and maintained in a vertical position and also lowered upon the other at one movement of the lever, thereby enabling a more rapid change of the working devices in the turning of the planter, and requiring the services of but one hand of the operator, while guiding the team with the other. A catch, d', on post E' secures the marker in an upright position when the planter is driven to or from the field.

In the operation of my planter the feeding-plates are arranged under the hopper with respect to the kind of seed to be dropped. I then arrange the cams upon the wheels so that the seed may be dropped at the desired intervals, and for this purpose the distance will be ascertained, and as many points of the cams thrown out to meet the face of the automatic connecting-rod as the conditions require. For instance, the cams may be arranged five inches or less apart. If corn is to be dropped, but two cams will be permitted to meet the face of the automatic connecting-rod, and their distance apart being accurately determined on the wheel, at each revolution the cam strikes the rod after passing over a corresponding distance upon the ground. The feed-plates are thereby opened and the corn dropped. In planting in drills all the points of the cams are thrown outward, if necessary, and the seed dropped with corresponding rapidity. When cotton is dropped, the graduating-plate, made of increased depth, is then inserted, and also a wider feeding and dropping plate.

It will be seen that in planting with special varieties of seed the only change necessitated is in the graduating-plate, which can be quickly adjusted, while the method of dropping is entirely automatic, saving labor and combining in one machine all the essential advantages of a planter.

Having fully described my invention, what I claim as new, and desire to secure by Letters Patent, is—

1. A driving-wheel for a planter, having on the inner side of said wheel one or more independently-arranged cams adapted to rotate separately upon suitable bearings for direct adjustment in relation to the rod operating the feeding and dropping plates, for the purpose specified.

2. In a combined planter for corn, cotton, and other seeds, having a hopper for receiving the seeds, the upper feeding and lower dropping plates attached together and having perforations at alternate angles, said plates being connected with a suitable shaft and operated at measured intervals by means of the cams upon the driving-wheels, substantially as described.

3. In combination with a duplex perforated feeding and dropping plate under the hopper of a planter, actuated simultaneously in one direction by suitable mechanism from the driving-wheels at measured intervals, a movable transversely-arranged graduating-plate provided with openings of various sizes, and playing between and at right angles to the feeding and dropping plates, for the purpose described.

4. In combination with the driving-wheel of a planter, provided with one or more independent rotary cams adjustably arranged thereon, a connecting-rod attached to a crank-shaft, and a spring located upon said rod, for the purpose described.

5. In combination with the driving-wheels of a planter, a cleaning device consisting of two parallel hinged plates attached to the frame-work of the planter, and kept in contact with the wheels by a suitable spring between said plates, and a catch located on the planter to hold the plate from contact with said wheels when desired, as described.

OSCAR F. JARVIS.

Witnesses:
L. B. BAILEY,
T. H. KENNEDY.